(12) United States Patent
Terai et al.

(10) Patent No.: US 10,483,587 B2
(45) Date of Patent: Nov. 19, 2019

(54) SULFIDE SOLID ELECTROLYTE

(71) Applicant: IDEMITSU KOSAN CO., LTD., Tokyo (JP)

(72) Inventors: Kota Terai, Sodegaura (JP); Futoshi Utsuno, Sodegaura (JP); Takashi Umeki, Sodegaura (JP); Masaru Nakagawa, Sodegaura (JP); Hiroshi Yamaguchi, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/239,140

(22) Filed: Jan. 3, 2019

(65) Prior Publication Data
US 2019/0140313 A1 May 9, 2019

Related U.S. Application Data

(63) Continuation of application No. PCT/JP2017/028782, filed on Aug. 8, 2017.

(30) Foreign Application Priority Data

Sep. 12, 2016 (JP) ................. 2016-177844
Dec. 21, 2016 (JP) ................. 2016-248018
May 2, 2017 (JP) ................. 2017-091745

(51) Int. Cl.
*H01M 10/0562* (2010.01)
*H01M 10/0525* (2010.01)
(Continued)

(52) U.S. Cl.
CPC .......... *H01M 10/0562* (2013.01); *H01B 1/06* (2013.01); *H01B 1/10* (2013.01);
(Continued)

(58) Field of Classification Search
CPC ..................... H01M 10/0562; H01M 10/0525
See application file for complete search history.

(56) References Cited

U.S. PATENT DOCUMENTS

2010/0290969 A1  11/2010  Deiseroth et al.
2016/0156064 A1   6/2016  Miyashita et al.
(Continued)

FOREIGN PATENT DOCUMENTS

JP    2010-540396 A    12/2010
JP    2015/220013 A    12/2015
(Continued)

OTHER PUBLICATIONS

Boulineau et al.—"Mechanochemical synthesis of Li-argyrodite $Li_6PS_5X$ (X=Ci, Br, I) as sulfur-based solid electrolytes for all solid state batteries application", Solid State Ionics, vol. 221 (Aug. 3, 2012), pp. 1-5.
(Continued)

*Primary Examiner* — Stewart A Fraser
(74) *Attorney, Agent, or Firm* — Oblon, McClelland, Maier & Neustadt, L.L.P.

(57) ABSTRACT

A sulfide solid electrolyte containing lithium, phosphorus, sulfur, and two or more of elements X selected from halogen elements, where the sulfide solid electrolyte includes an argyrodite-type crystal structure, and a molar ratio of the sulfur to the phosphorus "b (S/P)" and a molar ratio of the element X to the phosphorus "c (X/P)" satisfy the following formula (1):

$$0.23 < c/b < 0.57 \qquad (1).$$

20 Claims, 2 Drawing Sheets

(51) Int. Cl.
*H01B 1/06* (2006.01)
*H01B 1/10* (2006.01)
*H01M 10/052* (2010.01)
*H01M 4/136* (2010.01)
*H01M 10/058* (2010.01)
*H01M 4/58* (2010.01)

(52) U.S. Cl.
CPC ......... *H01M 4/136* (2013.01); *H01M 10/052* (2013.01); *H01M 10/058* (2013.01); *H01M 10/0525* (2013.01); *H01M 4/5815* (2013.01); *H01M 2300/0068* (2013.01)

(56) References Cited

U.S. PATENT DOCUMENTS

| | | | |
|---|---|---|---|
| 2016/0248119 A1* | 8/2016 | Kato | H01B 1/10 |
| 2017/0187066 A1* | 6/2017 | Tsujimura | H01M 10/0562 |
| 2017/0222257 A1 | 8/2017 | Miyashita et al. | |
| 2017/0352916 A1 | 12/2017 | Miyashita et al. | |
| 2018/0069262 A1* | 3/2018 | Utsuno | H01M 4/36 |
| 2018/0366779 A1* | 12/2018 | Katoh | H01B 1/10 |

FOREIGN PATENT DOCUMENTS

| | | |
|---|---|---|
| JP | 2016-24874 A | 2/2016 |
| WO | 2015/012042 A1 | 1/2015 |
| WO | 20151011937 A1 | 1/2015 |
| WO | 20151064518 A1 | 5/2015 |
| WO | 2016/104702 A1 | 6/2016 |
| WO | 2019/009228 A1 | 1/2019 |

OTHER PUBLICATIONS

Rao et al.—"Studies of lithium argyrodite solid electrolytes for all-solid-state batteries", Phys. Status Solidi A 208, No. 8, pp. 1804-1807 (2011).
Deiseroth et al.—"$Li_6PS_5X$: A Class of Crystalline Li-Rich Solids With an Unusually High $Li^+$ Mobility" Angew. Chem. Int. Ed. 2008, 47, pp. 755-758.
Hayashi et al.—Preparation and characterization of highly lithium ion conducting argyrodite-type $Li_6PS_5X$ (X—Ci, Br, I) solid electrolytes 1 H2-50, The Chemical Society of Japan (2014).
Ukawa et al.—"Characterization of argyrodite-type $Li_6PS_5Cl_{1-x}Br_x$ solid electrolytes" The Electrochemical Society of Japan Dai 82 Kai Koen Yoshishu (2015), Mar. 15, 2015 2H08.
International Preliminary Report on Patentability and Written Opinion dated Mar. 21, 2019 issued in corresponding PCT application PCT/JP2017/028782.
International Search Report dated Oct. 10, 2017 issued in corresponding PCT application PCT/JP2017/028782.

* cited by examiner

SULFIDE SOLID ELECTROLYTE

TECHNICAL FIELD

The invention relates to a sulfide solid electrolyte, an electrode mix and a lithium ion battery.

BACKGROUND ART

With rapid spread of information-related equipment or communications equipment such as personal computers, video cameras, and mobile phones in recent years, development of batteries used as a power source thereof has been considered to be important. Among these batteries, a lithium ion battery has attracted attention from a viewpoint of high energy density.

In the lithium ion battery that is currently commercially available, a liquid electrolyte containing a flammable organic solvent is used, and therefore, attachment of a safety device that suppresses an increase in temperature at the time of short circuit, or improvement in structural and material aspects for preventing short circuit is required. On the other hand, in the lithium ion battery formed into all-solid-state battery by using a solid electrolyte in place of the liquid electrolyte, it is considered that the flammable organic solvent is not used in the battery, and therefore, the safety device can be simplified, and the lithium ion battery is excellent in a production cost or productivity.

As the solid electrolyte used in the lithium ion battery, a sulfide solid electrolyte is known. As a crystal structure of the sulfide solid electrolyte, various structures are known. As one of such crystal structures, an argyrodite-type crystal structure is known (Patent Literatures 1 to 5, Non-Patent Literatures 1 to 3). Non-Patent Literatures 4 and 5 disclose a solid electrolyte that has a composition of $Li_6PS_5X$ and contains chlorine and bromine at a specific ratio. Some of the argyrodite-type crystal structures have high lithium ion conductivity. However, further improvement in ion conductivity is required. In addition, in general, the sulfide solid electrolyte has a problem of a possibility of reacting with moisture in air to generate hydrogen sulfide.

CITATION LIST

Patent Literature

Patent Literature 1: JP-T-2010-540396
Patent Literature 2: WO2015/011937
Patent Literature 3: WO2015/012042
Patent Literature 4: JP-A-2016-24874
Patent Literature 5: WO2016/104702

Non-Patent Literature

Non-Patent Literature 1: Angew. Chem Vol. 47 (2008), No. 4, P. 755-758
Non-Patent Literature 2: Phys. Status. Solidi Vol. 208 (2011), No. 8, P. 1804-1807
Non-Patent Literature 3: Solid State Ionics Vol. 221 (2012) P. 1-5
Non-Patent Literature 4: Abstract of the 82nd lecture of the Electrochemical Society of Japan (2015), 2H08
Non-Patent Literature 5: P. 474, 1 H2-50 of the 94th spring annual meeting proceedings (2014) of the Japan Chemical Society

SUMMARY OF INVENTION

One object of the invention is to provide a new sulfide solid electrolyte having higher ion conductivity.

Further, another object of the invention is to provide a new excellent sulfide solid electrolyte in which a generated hydrogen sulfide amount is suppressed.

According to one embodiment of the invention, provided is a sulfide solid electrolyte comprising lithium, phosphorus, sulfur, and two or more of elements X selected from halogen elements, wherein the sulfide solid electrolyte comprises an argyrodite-type crystal structure, and a molar ratio of the sulfur to the phosphorus "b (S/P)" and a molar ratio of the element X to the phosphorus "c (X/P)" satisfy the following formula (1):

$$0.23 < c/b < 0.57 \quad (1).$$

Further, according to one embodiment of the invention, an electrode mix comprising the sulfide solid electrode and an active material is provided.

Further, according to one embodiment of the invention, a lithium ion battery comprising at least one of the sulfide solid electrode and the electrode mix is provided.

According to one embodiment of the invention, a sulfide solid electrolyte having high ion conductivity can be provided.

Further, according to one embodiment of the invention, a sulfide solid electrolyte in which a generated hydrogen sulfide amount is suppressed can be provided.

DESCRIPTION OF EMBODIMENTS

A sulfide solid electrolyte according to one embodiment of the invention comprises lithium, phosphorus, sulfur, and two or more of elements X selected from halogen elements. Further, the sulfide solid electrolyte comprises an argyrodite-type crystal structure, being characterized in that a molar ratio of the sulfur to the phosphorus "b (S/P)" and a molar ratio of the element X to the phosphorus "c (X/P)" satisfy the following formula (1):

$$0.23 < c/b < 0.57 \quad (1).$$

In addition, the molar ratio of the element X refers to the molar ratio of a total of all halogen elements contained in the sulfide solid electrolyte. For example, when the element X includes two halogens $x_1$ and $x_2$, the molar ratio c of the element X to the phosphorus is expressed by a ratio: $(x_1+x_2)/P$.

A ratio: c/b in the above-described formula (1) is a molar ratio of the halogen element to the sulfur in the sulfide solid electrolyte. In the sulfide solid electrolyte comprising the argyrodite-type crystal structure and comprising two or more of halogen elements, the ion conductivity of the sulfide solid electrolyte is increased by adjusting the molar ratio of the halogen element to the sulfur in the range according to the formula (1).

In general, various crystal components and amorphous components are present in a mixed manner in the sulfide solid electrolyte. A part of the halogen (element X) input as a constituent element of the sulfide solid electrolyte forms the argyrodite-type crystal structure, and the rest of the halogen forms a crystal structure other than the argyrodite-type crystal structure and the amorphous component. Further, a case where the rest of the halogen is contained in a remaining raw material is also considered.

The argyrodite-type crystal structure is a structure having a $PS_4^{3-}$ structure as a main unit structure of a skeleton, in which sites in the circumference of the structure are occupied by the S and the halogen surrounded by Li. A general argyrodite-type crystal structure has a crystal structure indicated by a space group F-43M. The crystal structure is indicated by No. 216 in the database of International Tables for Crystallography Volume G: Definition and exchange of crystallographic data (ISBN: 978-1-4020-3138-0). In the crystal structure indicated by No. 216, a 4a site and a 4d site are present in the circumference of the $PS_4^{3-}$ structure, in which an element having a large ionic radius easily occupies the 4a site, and an element having a small ionic radius easily occupies the 4d site. In this embodiment, it is estimated that a larger amount of halogen can be occupied in both the 4a site and the 4d site than ever before by incorporating proper amounts of two or more halogens into the sulfide solid electrolyte. As a result, the present inventors have found a new sulfide solid electrolyte comprising the argyrodite-type crystal structure in which a halogen content is high.

A unit lattice of the argyrodite-type crystal structure has eight sites in total with regard to the 4a sites and the 4d sites. An increase of an amount of the halogen occupying the site in the argyrodite-type crystal structure means that an amount of the S occupying the site in the argyrodite-type crystal structure is relatively reduced. The halogen in which valence is −1 has weaker force to attract Li than the S in which valence is −2. Further, the number of Li attracted by the halogen is small. Therefore, it is considered that the ion conductivity of the argyrodite-type crystal structure is increased because density of Li in the circumference of the site is reduced, and Li becomes easily movable.

Examples of the halogen element include F, Cl, Br, and I.

Since an effect of improving the ion conductivity is larger, the above-described formula (1) is preferably in a formula: $0.25 \leq c/b \leq 0.43$, and more preferably in a formula: $0.30 \leq c/b \leq 0.41$.

In the present application, as a molar ratio of each element or a composition in the sulfide solid electrolyte, a value measured by ICP emission spectrometry is to be used except for special circumstances such as a difficulty in analysis. A measurement method for the ICP emission spectrometry will be described in Examples.

The molar ratio of each element can be controlled by adjusting a content of each element in a raw material.

The sulfide solid electrolyte of this embodiment comprises the argyrodite-type crystal structure. It can be confirmed that the sulfide solid electrolyte comprises the argyrodite-type crystal structure by having diffraction peaks at $2\theta = 25.2 \pm 0.5$ deg and $29.7 \pm 0.5$ deg in powder X-ray diffractometry using CuKα rays.

The diffraction peaks at $2\theta = 25.2 \pm 0.5$ deg and $29.7 \pm 0.5$ deg are peaks arising from the argyrodite-type crystal structure.

The diffraction peaks of the argyrodite-type crystal structure appear also at $2\theta = 15.3 \pm 0.5$ deg, $17.7 \pm 0.5$ deg, $31.1 \pm 0.5$ deg, $44.9 \pm 0.5$ deg and $47.7 \pm 0.5$ deg in several cases, for example. The sulfide solid electrolyte of this embodiment may have these peaks.

In addition, in the present application, a position of the diffraction peak is judged in the range of A±0.5 deg or A±0.4 deg when a median value is taken as A, but the position is preferably A±0.3 deg. For example, in the case of the above-described diffraction peak at $2\theta = 25.2 \pm 0.5$ deg, the median value A is 25.2 deg and the peak is preferably present in the range of $2\theta = 25.2 \pm 0.3$ deg. The same is also applied to judgement of the positions of all other diffraction peaks in the present application.

In this embodiment, the number of the elements X contained in the sulfide solid electrolyte is preferably two or more and four or less, more preferably two or three, and further preferably two.

At least one of the elements X is preferably chlorine or bromine, and the element X further preferably includes chlorine and bromine.

When at least one of the elements X is chlorine, it is preferable to satisfy the following formula (2):

$$0.25 < X_{Cl} < 1 \tag{2}$$

(wherein $X_{Cl}$ represents a molar ratio of chlorine to an element X).

The ion conductivity is further increased by satisfying the formula (2). Since a conduction path by mixing chlorine with other ions is formed, the formula (2) is preferably in a formula: $0.30 \leq X_{Cl} \leq 0.95$, and more preferably in a formula $0.35 \leq X_{Cl} \leq 0.95$.

It is estimated that a region where the ion conductivity is higher is present depending on the kind of the elements X or a combination thereof, as described above.

In the sulfide solid electrolyte of this embodiment, in the case of formulas: $0.30 \leq c/b \leq 0.41$ and $0.25 < X_{Cl} < 1$, the ion conductivity can be increased to a level as high as 6.9 mS/cm or more. In the case of formulas: $0.30 \leq c/b \leq 0.41$ and $0.35 \leq X_{Cl} \leq 0.95$, the ion conductivity can be further increased to a level as high as 9 mS/cm to 13 mS/cm.

In the sulfide solid electrolyte of this embodiment, the molar ratio of the element X to the phosphorus "c (X/P)" is preferably greater than 1.1 and 1.9 or less, and more preferably 1.4 or more and 1.8 or less. An effect of improving the ion conductivity of the sulfide solid electrolyte is further enhanced by adjusting the molar ratio c within the above-described range.

In the sulfide solid electrolyte of this embodiment, when a molar ratio of the lithium to the phosphorus is taken as "a (Li/P)", a molar ratio of the sulfur to the phosphorus is taken as "b (S/P)" and a molar ratio of the element X to the phosphorus is taken as "c (X/P)", it is preferable to satisfy the following formulas (A) to (C):

$$5.0 \leq a \leq 7.5 \tag{A}$$

$$6.5 \leq a+c \leq 7.5 \tag{B}$$

$$0.5 \leq a-b \leq 1.5 \tag{C}$$

(wherein b>0 and c>0 are satisfied).

The argyrodite-type crystal structure is easily formed by satisfying the above-described formulas (A) to (C).

The above-described formula (B) is preferably in a formula: $6.6 \leq a+c \leq 7.4$, and more preferably in a formula: $6.7 \leq a+c \leq 7.3$.

The above-described formula (C) is preferably in a formula: $0.6 \leq a-b \leq 1.3$, and more preferably in a formula: $0.7 \leq a-b \leq 1.3$.

The sulfide solid electrolyte may contain an element such as Si, Ge, Sn, Pb, B, Al, Ga, As, Sb and Bi in addition to the lithium, the phosphorus, the sulfur, and the element X as described above. Further, the sulfide solid electrolyte may contain a chalcogen element (oxygen (O), selenium (Se), tellurium (Te), or the like). When the sulfide solid electrolyte contains one or more elements M selected from the group consisting of Si, Ge, Sn, Pb, B, Al, Ga, As, Sb and Bi, a molar ratio of each element in the above-described formulas (A) to (C) is taken as a molar ratio of each element to a total of the element M and the phosphorus. For example, the molar ratio of the lithium to the phosphorus "a (Li/P)" is taken as Li/(P+M).

The sulfide solid electrolyte of this embodiment preferably satisfies the composition represented by the following formula (3), for example:

$$Li_a(P_{1-\alpha}M_\alpha)S_bX_c \quad (3)$$

(wherein M is one or more of elements selected from the group consisting of Si, Ge, Sn, Pb, B, Al, Ga, As, Sb and Bi, and X is two or more of elements selected from the group consisting of F, Cl, Br and I; a to c satisfy the following formulas (A) to (C); and a satisfies $0 \leq \alpha \leq 0.3$):

$$5.0 \leq a \leq 7.5 \quad (A)$$

$$6.5 \leq a+c \leq 7.5 \quad (B)$$

$$0.5 \leq a-b \leq 1.5 \quad (C)$$

(wherein b>0 and c>0 are satisfied).

X in the formula (3) represents two or more of elements ($x_1, \ldots, x_n$; n is an integer of 2 or more and 4 or less) selected from the group consisting of F, Cl, Br and I. The ion conductivity is increased by incorporation of the halogen element into the argyrodite-type crystal structure. X is preferably composed of two ($x_1, x_2$) or three ($x_1, x_2, x_3$) of elements, and more preferably two of elements. The molar ratio of each element is not particularly limited, but when the structure includes chlorine, it is preferable to satisfy the above-described formula (2).

α is preferably 0.

The above-described formula (B) is preferably in a formula: $6.6 \leq a+c \leq 7.4$, and more preferably in a formula: $6.7 \leq a+c \leq 7.3$.

The above-described formula (C) is preferably in a formula: $0.6 \leq a-b \leq 1.3$, and more preferably in a formula: $0.7 \leq a-b \leq 1.3$.

The molar ratio of each element or the composition described above does not mean a molar ratio or a composition in an input raw material used in production, but means a molar ratio or a composition in the sulfide solid electrolyte, which is a product. The molar ratio of each element can be controlled by adjusting the content of each element in the raw material, for example.

It is preferable that the sulfide solid electrolyte of this embodiment does not have a diffraction peak of lithium halide in the powder X-ray diffraction using CuKα rays, or when the sulfide solid electrolyte has the diffraction peak, satisfies the following formula (4):

$$0 < I_A/I_B < 0.1 \quad (4)$$

(wherein $I_A$ represents intensity of a diffraction peak of lithium halide, and $I_B$ represents intensity of a diffraction peak at $2\theta = 25.2 \pm 0.5$ deg).

The above-described formula (4) indicates that an amount of lithium halide is relatively smaller in comparison with the argyrodite-type crystal structure. Presence of lithium halide means that an excessive amount of halogen is present in a solid electrolyte due to a cause such as a case where halogen content in the raw material is high. In addition, for example, when the lithium halide is LiCL, $I_A$ is taken as intensity of a diffraction peak at $2\theta = 50.3 \pm 0.5$ deg, when the lithium halide is LiBr, $I_A$ is taken as intensity of a diffraction peak at $2\theta = 46.7 \pm 0.5$ deg, when the lithium halide is LiF, $I_A$ is taken as intensity of a diffraction peak at $2\theta = 45.0 \pm 0.5$ deg, and when the lithium halide is LiI, $I_A$ is taken as intensity of a diffraction peak at $2\theta = 42.4 \pm 0.5$ deg, and $I_A$ is a total of intensity of the diffraction peaks of the lithium halides. The formula (4) is more preferably in a formula: $0 < I_A/I_B < 0.05$, and further preferably in a formula: $0 < I_A/I_B < 0.03$.

Further, it is preferable that the sulfide solid electrolyte of this embodiment does not have a diffraction peak at $2\theta = 17.6 \pm 0.4$ deg and $2\theta = 18.1 \pm 0.4$ deg (not the diffraction peak arising from the argyrodite-type crystal structure) in the powder X-ray diffraction using CuKα rays, or when the sulfide solid electrolyte has the diffraction peak, satisfies the following formula (5):

$$0 < I_C/I_D < 0.05 \quad (5)$$

(wherein $I_C$ represents intensity of a diffraction peak which is not the diffraction peak of the argyrodite-type crystal structure between the diffraction peaks at $2\theta = 17.6 \pm 0.4$ deg and $2\theta = 18.1 \pm 0.4$ deg, and $I_D$ represents intensity of a diffraction peak at $2\theta = 29.7 \pm 0.5$ deg).

A crystal structure specified by $I_C$ (hereinafter, referred to as a $Li_3PS_4$ crystal structure) has low ion conductivity, and therefore, reduces the ion conductivity of the solid electrolyte. The above-described formula (5) indicates that an amount of the $Li_3PS_4$ crystal structure is relatively smaller in comparison with the argyrodite-type crystal structure. The formula (5) is more preferably in a formula: $0 < I_C/I_D < 0.03$, and further, preferably in a formula: $0 < I_C/I_D < 0.02$.

In addition, either $2\theta = 17.6 \pm 0.4$ deg or $2\theta = 18.1 \pm 0.4$ deg ordinarily overlaps with the diffraction peak of the argyrodite-type crystal structure in which intensity of the peak is relatively strong, and therefore, the peak at $2\theta = 17.6 \pm 0.4$ deg or $2\theta = 18.1 \pm 0.4$ deg cannot be measured in several cases. Accordingly, an expression "the diffraction peak that is not the diffraction peak of the argyrodite-type crystal structure between the diffraction peaks at $2\theta = 17.6 \pm 0.4$ deg and $2\theta = 18.1 \pm 0.4$ deg" ordinarily means a peak having lower intensity between these two peaks observed. In addition, a background or noise in a measured intensity S/N ratio is observed as the peak in several cases. In such a case, even if such a background or noise is assumed as $I_D$, the formula (5) is obviously satisfied.

Further, it is preferable that the sulfide solid electrolyte of this embodiment does not have a diffraction peak other than the diffraction peak of the argyrodite-type crystal structure in the powder X-ray diffraction using CuKα rays, or when the sulfide solid electrolyte has the diffraction peak, satisfies the following formula:

$$0 < I_E/I_D < 0.1$$

(wherein $I_E$ represents intensity of a diffraction peak other than the diffraction peak of the argyrodite-type crystal structure, and $I_D$ represents intensity of a diffraction peak at $2\theta = 29.7 \pm 0.5$ deg).

The above-described formula is more preferably in a formula: $0 < I_E/I_D < 0.05$, and further preferably in a formula: $0 < I_E/I_D < 0.03$.

The sulfide solid electrolyte of this embodiment can be prepared according to a production method having a step of applying mechanical stress to a mixture of the raw materials to cause reaction as described later to prepare an intermediate and a step of applying heat treatment to the intermediate to cause crystallization.

As the raw materials to be used, two or more of compounds containing, as a whole, the elements to be contained in the sulfide solid electrolyte to be produced as essential elements, namely, lithium, phosphorus, sulfur, and two or more of elements X selected from the halogen elements are used, or elementary substances are combined and used.

Examples of the raw material containing lithium include a lithium compound such as lithium sulfide ($Li_2S$), lithium oxide ($Li_2O$), and lithium carbonate ($Li_2CO_3$), and an elemental lithium metal. Above all, a lithium compound is preferable, and lithium sulfide is more preferable.

The lithium sulfide described above can be used without particular limitation, but a material having high purity is preferable. The lithium sulfide can be produced by the method described in JP-A-H07-330312, JP-A-H09-283156, JP-A-2010-163356, or JP-A-2011-84438, for example.

Specifically, the lithium sulfide can be synthesized by reacting hydrogen sulfide and lithium hydroxide at 70° C. to 300° C. in a hydrocarbon-based organic solvent to form lithium hydrosulfide, and subsequently removing hydrogen sulfide from this reaction liquid (JP-A-2010-163356).

Further, the lithium sulfide can be synthesized by reacting hydrogen sulfide and lithium hydroxide at 10° C. to 100° C. in an aqueous solvent to form lithium hydrosulfide, and subsequently removing hydrogen sulfide from this reaction liquid (JP-A-2011-84438).

Examples of the raw material containing phosphorus include a phosphorus compound such as phosphorus sulfide including phosphorus trisulfide ($P_2S_3$) and phosphorus pentasulfide ($P_2S_5$), and sodium phosphate ($Na_3PO_4$), and a phosphorus elementary substance. Above all, phosphorus sulfide is preferable, and phosphorus pentasulfide ($P_2S_5$) is more preferable. The phosphorus compound such as phosphorus pentasulfide ($P_2S_5$) or the phosphorus elementary substance can be used without particular limitation, as long as such a material is industrially produced and commercially available.

As the raw material containing the element X, it is preferable that the raw material contains a halogen compound represented by the following formula (6), for example.

$$M_l\text{-}X_m \quad (6)$$

In the formula (6), M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi) or materials in which an oxygen element or a sulfur element is bonded to these elements, and lithium (Li) or phosphorus (P) is preferable, and lithium (Li) is more preferable.

X is the halogen element selected from the group consisting of fluorine (F), chlorine (Cl), bromine (Br) and iodine (I).

Further, l is an integer of 1 or 2 and m is an integer of 1 to 10. When m is the integer of 2 to 10, that is, when a plurality of Xs are present, the Xs may be the same with or different from each other. For example, in $SiBrCl_3$ to be described later, m is 4, and X is formed of different elements, namely, Br and Cl.

Specific examples of the halogen compound represented by the above-described formula (6) include sodium halide such as NaI, NaF, NaCl and NaBr; lithium halide such as LiF, LiCl LiBr and LiI; boron halide such as $BCl_3$, $BBr_3$ and $BI_3$; aluminum halide such as $AlF_3$, $AlBr_3$, $AlI_3$ and $AlCl_3$; silicon halide such as $SiF_4$, $SiCl_4$, $SiCl_3$, $Si_2Cl_6$, $SiBr_4$, $SiBrCl_3$, $SiBr_2Cl_2$ and $SiI_4$; phosphorus halide such as $PF_3$, $PF_5$, $PCl_3$, $PCl_5$, $POCl_3$, $PBr_3$, $POBr_3$, $PI_3$, $P_2Cl_4$ and $P_2I_4$; sulfur halide such as $SF_2$, $SF_4$, $SF_6$, $S_2F_{10}$, $SCl_2$, $S_2Cl_2$ and $S_2Br_2$; germanium halide such as $GeF_4$, $GeCl_4$, $GeBr_4$, $GeI_4$, $GeF_2$, $GeCl_2$, $GeBr_2$ and $GeI_2$; arsenic halide such as $AsF_3$, $AsCl_3$, $AsBr_3$, $AsI_3$ and $AsF_5$; selenium halide such as $SeF_4$, $SeF_6$, $SeCl_2$, $SeCl_4$, $Se_2Br_2$ and $SeBr_4$; tin halide such as $SnF_4$, $SnCl_4$, $SnBr_4$, $SnI_4$, $SnF_2$, $SnCl_2$, $SnBr_2$ and $SnI_2$; antimony halide such as $SbF_3$, $SbCl_3$, $SbBr_3$, $SbI_3$, $SbF_5$ and $SbCl_5$; tellurium halide such as $TeF_4$, $Te_2F_{10}$, $TeF_6$, $TeCl_2$, $TeCl_4$, $TeBr_2$, $TeBr_4$ and $TeI_4$; lead halide such as $PbF_4$, $PbCl_4$, $PbF_2$, $PbCl_2$, $PbBr_2$ and $PbI_2$; and bismuth halide such as $BiF_3$, $BiCl_3$, $BiBr_3$ and $BiI_3$.

Above all, examples preferably include lithium halide such as lithium chloride (LICl), lithium bromide (LiBr) and lithium iodide (LiI), and phosphorous halide such as phosphorus pentachloride ($PCl_5$), phosphorus trichloride ($PCl_3$), phosphorus pentabromide ($PBr_5$), and phosphorus tribromide ($PBr_3$).

Above all, lithium halide such as LiCl, LiBr and LiI and $PBr_3$ is preferable, and lithium halide such as LiCl, LiBr and LiI is more preferable, and LiCl and LiBr are further preferable.

As the halogen compound, one of the above-described compounds may be used alone, or two or more may be combined and used. That is, at least one of the above-described compounds can be used.

In this embodiment, the raw material preferably contains a lithium compound, a phosphorus compound and two or more of halogen compounds, and at least one of the lithium compound and the phosphorus compound preferably contains a sulfur element. The raw material more preferably contains lithium sulfide and phosphorus sulfide and a combination of two or more of lithium halides, and further preferably contains lithium sulfide and phosphorus pentasulfide and a combination of two or more of lithium halides.

For example, when lithium sulfide, phosphorus pentasulfide and two or more of lithium halides are used as the raw materials of the sulfide solid electrolyte of this embodiment, a molar ratio of the input raw materials can be adjusted to a ratio: 30 to 60:10 to 25:15 to 50 in lithium sulfide:phosphorus pentasulfide:a total of two or more of lithium halides.

In this embodiment, the mechanical stress is applied to the above-described raw materials to cause reaction to prepare the intermediate. Here, an expression "the mechanical stress is applied" means that shear force, impact force or the like is mechanically applied thereto. Examples of a means for applying the mechanical stress can include a pulverizer such as a planetary ball mill, a vibrating mill and a rolling mill, and a kneader.

In the conventional technology (for example, Patent Literature 2), the raw materials are pulverized and mixed to such an extent that crystallinity of raw material powder can be maintained. On the other hand, in this embodiment, it is preferable that the mechanical stress is applied to the raw materials to cause reaction to prepare the intermediate containing a glass component. That is, the raw materials are pulverized and mixed by the mechanical stress higher than the stress according to the conventional technology into a state in which at least part of the raw material powder cannot maintain the crystallinity. Consequently, a $PS_4$ structure that is a basic skeleton of the argyrodite-type crystal structure can be formed and the halogen can be highly dispersed in a stage of the intermediate. As a result, the halogen is easily incorporated into the argyrodite-type crystal structure upon being formed into the argyrodite-type crystal structure that is a stable phase at the time of heat treatment in a next step. Further, it is estimated that a low ion conductivity phase such as a $Li_3PS_4$ crystal structure is hard to be formed because of no passing through phases different for each region. Consequently, it is estimated that the sulfide solid electrolyte of the invention exhibits high ion conductivity.

In addition, it can be confirmed that the intermediate contains the glass (amorphous) component by presence of a broad peak (hallo pattern) arising from the amorphous component in an XRD measurement.

Further, in the sulfide solid electrolyte of this embodiment, it is unnecessary to heat the raw materials for 6 days at 550° C. as in the Patent Literature 1, and therefore mass productivity is high.

As conditions of pulverization and mixing, for example, when the planetary ball mill is used as the pulverizer, a revolution speed only needs to be adjusted to several tens to several hundreds of revolutions per minute and the raw materials only need to be treated for 0.5 hour to 100 hours. More specifically, in the case of the planetary ball mill (model No. P-7, manufactured by Fritsch Co.) used in Examples of the present application, the number of revolutions of the planetary ball mill is preferably 350 rpm or more and 400 rpm or less, more preferably 360 rpm or more and 380 rpm or less.

With regard to a ball, which is pulverization media, for example, when a zirconia ball is used, a diameter thereof is preferably 0.2 to 20 mm.

The intermediate prepared by pulverizing and mixing is heat-treated. A heat treatment temperature is preferably 350 to 650° C., more preferably 360 to 500° C., and further preferably 380 to 450° C. The halogen contained in the argyrodite-type crystal structure tends to increase by adjusting the heat treatment temperature to a slightly lower level as compared with conventional technologies.

An atmosphere of the heat treatment is not particularly limited, but is preferably under an atmosphere of inert gas such as nitrogen and argon, and not under a hydrogen sulfide stream. It is estimated that an amount of halogen in the crystal structure can be increased by suppressing a free halogen in the crystal structure from being substituted for sulfur, and as a result, the ion conductivity of the obtained sulfide solid electrolyte is improved.

When the kneader is used as the means for applying the above-described mechanical stress, the kneader is not particularly limited, but from a viewpoint of a capability of easily producing the electrolyte, a multiple screw kneader having two or more shafts is preferable.

As the multiple screw kneader, for example, as long as such a kneader is applied as equipment equipped with a casing, and two or more rotating shafts arranged so as to penetrate through the casing in a longitudinal direction and equipped with a paddle (screw) along an axial direction, and equipped with a raw material feed opening at one end of the casing in the longitudinal direction and a discharge opening at the other end, in which two or more rotational movements act with each other to generate the mechanical stress, any other configuration is not particularly limited. The two or more rotational movements act with each other by rotating the two or more rotating shafts equipped with the paddles of such a multiple screw kneader. Thus, the mechanical stress can be generated, and the mechanical stress can be applied to the raw materials moving from the feed opening to the discharge opening along the rotating shaft to cause reaction.

Figure 3:
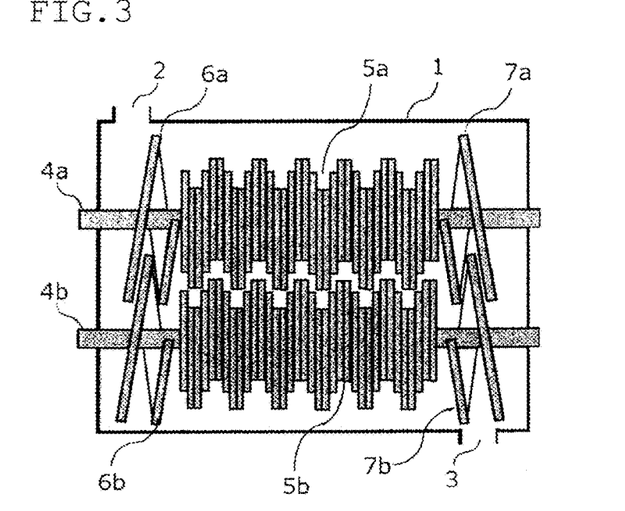
FIG. 3 is a plan view showing a multiple screw kneader used for production of a sulfide solid electrolyte, which is cut at a center of a rotating shaft as one example of the multiple screw kneader.
Figure 4:
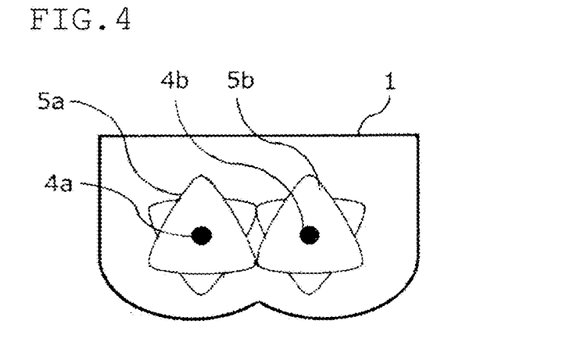
FIG. 4 is a plan view showing a part to be provided with a paddle of a rotating shaft, which is cut perpendicularly to the rotating shaft as one example of a multiple screw kneader used for production of a sulfide solid electrode.

One preferable example of the multiple screw kneader that may be used in the invention will be described with reference to FIG. 3 and FIG. 4. FIG. 3 is a plan view showing a kneader cut at a center of the rotating shaft, and FIG. 4 is a plan view showing a part to be provided with a paddle of a rotating shaft, which is cut perpendicularly to the rotating shaft.

The multiple screw kneader shown in FIG. 3 is a twin screw kneader equipped with a casing 1 having a feed opening 2 at one end and a discharge opening 3 at the other end, and two rotating shafts 4a and 4b arranged so as to penetrate through the casing 1 in the longitudinal direction. On the rotating shafts 4a and 4b, a paddle 5a and a paddle 5b are provided, respectively. The raw materials enter into the casing 1 through the feed opening 2, in which the mechanical stress is applied thereto in the paddle 5a and the paddle 5b to cause reaction, and the thus obtained reaction product is discharged from the discharge opening 3.

The number of the rotating shafts 4 is not particularly limited, as long as the number is two or more. In view of versatility, the number is preferably two to four, and more preferably two. Further, the rotating shaft 4 is preferably parallel shafts in parallel with each other.

The paddle 5 is equipped on the rotating shaft in order to knead the raw materials, and is also called a "screw". A cross-sectional shape of the paddle 5 is not particularly limited, and examples include a substantial triangle in which each side of an equilateral triangle is uniformly formed into a convex circular arc shape, as shown in FIG. 4, and also a circular shape, an elliptical shape, and a substantially quadrangular shape, and the cross sectional shape may be a shape partially having a notch portion based on the shape.

When the shaft is equipped with a plurality of paddles, as shown in FIG. 4, each paddle may be equipped on the rotating shaft with a different angle. Further, when an attempt is made on obtaining a further effect of kneading, a meshing type only needs to be selected as the paddle.

In addition, the number of revolutions of the paddle is not particularly limited, but is preferably 40 to 300 rpm, more preferably 40 to 250 rpm, and further preferably 40 to 200 rpm.

The multiple screw kneader may be equipped with a screw 6 on a side of the feed opening 2 as shown in FIG. 3 in order to smoothly supply the raw materials to the kneader, or with a reverse screw 7 on a side of the discharge opening 3 as shown in FIG. 3 so as to avoid stagnation of the reaction product obtained through the paddle 5 in the casing.

As the multiple screw kneader, a commercially available kneader can also be used. Examples of the commercially available multiple screw kneader include KRC Kneader (manufactured by Kurimoto Co., Ltd.).

A kneading time of the raw materials is different depending on the kind of the element constituting the sulfide solid electrolyte to be obtained, a composition ratio, and a temperature during the reaction, and therefore only needs to be appropriately adjusted, and is preferably 5 minutes to 50 hours, more preferably 10 minutes to 15 hours, and further preferably 1 to 12 hours.

A kneading temperature of the raw materials is different depending on the kind of the element constituting the sulfide solid electrolyte to be obtained, the composition ratio, and the time during the reaction, and therefore only needs to be appropriately adjusted, and is preferably 0° C. or higher, more preferably 25° C. or higher, further preferably 100° C. or higher, and most preferably 250° C. or higher. As a higher temperature is applied, the argyrodite-type crystal structure can be further precipitated at a time-point of kneading. If the temperature is 350° C. or higher, it is considered that the argyrodite-type crystal structure is further easily precipitated. In addition, an upper limit of the kneading temperature only needs to be at a degree at which the formed argyrodite-type crystal structure is not decomposed, namely, 650° C. or lower.

The intermediate output from the discharge opening of the multiple screw kneader may be supplied from the feed opening again according to a degree of progress of the reaction to further allow the progress of the reaction. The degree of progress of the reaction can be understood from an increase or decrease of the peaks arising from the raw materials of the thus obtained intermediate.

The sulfide solid electrolyte is obtained by applying heat treatment to the intermediate obtained by kneading the raw materials. A heat treatment temperature is preferably 350 to 650° C., more preferably 360 to 500° C., and further preferably 380 to 450° C. An atmosphere of the heat treatment is not particularly limited, but is preferably under an atmosphere of inert gas such as nitrogen and argon, and not under a hydrogen sulfide stream.

The sulfide solid electrolyte of the invention can be used in a solid electrolyte layer, a positive electrode, a negative electrode, or the like in a lithium ion secondary battery or the like.

[Electrode Mix]

An electrode mix according to one embodiment of the invention contains the sulfide solid electrolyte of the invention described above and an active material, or is produced from the sulfide solid electrolyte of the invention. If a negative electrode active material is used as the active material, the electrode mix is formed into a negative electrode mix. On the other hand, if a positive electrode active material is used, the electrode mix is formed into a positive electrode mix.

Negative Electrode Mix

The negative electrode mix is obtained by blending the negative electrode active material in the sulfide solid electrolyte of the invention.

As the negative electrode active material, a carbon material, a metallic material, or the like can be used. A composite formed of two or more of these materials can also be used. Further, a negative electrode active material that will be developed in the future can also be used.

Further, the negative active material preferably has electron conductivity.

Examples of the carbon material include graphite (artificial graphite, for example), a graphite carbon fiber, resin baked carbon, pyrolytic vapor grown carbon, coke, mesocarbon microbeads (MCMB), furfuryl alcohol resin baked carbon, polyacene, a pitch-based carbon fiber, a vapor grown carbon fiber, natural graphite, and nongraphitizing carbon.

Examples of the metallic material include an elemental metal, an alloy, and a metal compound. Examples of the elemental metal include metallic silicon, metallic tin, metallic lithium, metallic indium, and metallic aluminum. Examples of the alloy include an alloy containing at least one of silicon, tin, lithium, indium and aluminum. Examples of the metal compound include metal oxide. The metal oxide is silicon oxide, tin oxide, or aluminum oxide, for example.

A blending ratio of the negative electrode active material and the solid electrolyte is preferably the negative electrode active material:the solid electrolyte=95 wt %:5 wt % to 5 wt %:95 wt %, more preferably 90 wt %:10 wt % to 10 wt %:90 wt %, and further preferably 85 wt %:15 wt % to 15 wt %:85 wt %.

If a content of the negative electrode active material in the negative electrode mix is excessively small, electric capacity becomes small. Further, when the negative electrode active material has the electron conductivity and does not contain a conductive additive or contains only a small amount of the conductive additive, it is considered that the electron conductivity (electron conduction path) in the negative electrode is liable to be reduced to cause reduction of rate property, or a utilization factor of the negative electrode active material is liable to be reduced to cause reduction of the electric capacity. On the other hand, if the content of the negative electrode active material in the negative electrode mix is excessively large, it is considered that the ion conductivity (ion conduction path) in the negative electrode is liable to be reduced to cause reduction of the rate property, or the utilization factor of the negative electrode active material is liable to be reduced to cause reduction of the electric capacity.

The negative electrode mix can further contain the conductive additive.

When the electron conductivity of the negative electrode active material is low, it is preferable to add the conductive additive. The conductive additive only needs to have conductivity, and the electron conductivity is preferably $1 \times 10^3$ S/cm or more, and more preferably $1 \times 10^5$ S/cm or more.

Specific examples of the conductive additive preferably include a carbon material, and a material containing at least one element selected from the group consisting of nickel, copper, aluminum, indium, silver, cobalt, magnesium, lithium, chromium, gold, ruthenium, platinum, beryllium, iridium, molybdenum, niobium, osmium, rhodium, tungsten, and zinc, and more preferably a carbon elementary substance having high conductivity, a carbon material other than the carbon elementary substance; and an elemental metal including nickel, copper, silver, cobalt, magnesium, lithium, ruthenium, gold, platinum, niobium, osmium or rhodium, a mixture thereof or a compound thereof.

In addition, specific examples of the carbon material include carbon black such as Ketjenblack, acetylene black, denka black, thermal black, and channel black; graphite, a carbon fiber, and activated carbon, and the materials can be used alone or in combination of two or more. Above all, acetylene black, denka black, or Ketjenblack, each having high electron conductivity, is preferable.

A content of the conductive additive in the mix when the negative electrode mix contains the conductive additive is preferably 1 to 40 mass %, and more preferably 2 to 20 mass %. If the content of the conductive additive is excessively small, it is considered that the electron conductivity of the negative electrode is liable to be reduced to cause reduction of the rate property, or the utilization factor of the negative electrode active material is liable to be reduced to cause reduction of the electric capacity. On the other hand, if the content of the conductive additive is excessively large, an amount of the negative electrode active material and/or an amount of the solid electrolyte becomes small. It is estimated that, if the amount of the negative electrode active material becomes small, the electric capacity is reduced. Further, it is considered that, if the amount of the solid electrolyte becomes small, the ion conductivity of the negative electrode is liable to be reduced to cause reduction of the rate property, or the utilization factor of the negative electrode active material is liable to be reduced to cause reduction of the electric capacity.

The solid electrolyte may further contain a binder in order to tightly bind the negative electrode active material and the solid electrolyte with each other.

As the binder, a fluorine-containing resin such as polytetrafluoroethylene (PTFE), polyvinylidene fluoride (PVDF), and fluorocarbon rubber, a thermoplastic resin such as polypropylene and polyethylene, ethylene-propylene-diene rubber (EPDM), sulfonated EPDM, natural butyl rubber (NBR) or the like can be used alone or as a mixture of two or more. Further, a cellulose-based aqueous dispersion, an aqueous dispersion of styrene-butadiene rubber (SBR), or the like, which is an aqueous binder, can also be used.

The negative electrode mix can be produced by mixing the solid electrolyte and the negative electrode active material, and an arbitrary conductive additive and/or an arbitrary binder.

A mixing method is not particularly limited, but such a method can be applied thereto, for example, as dry mixing by mixing the materials by using a mortar, a ball mill, a bead mill, a jet mill, a planetary ball mill, a vibrating ball mill, a sand mill, and a cutter mill; and wet mixing in which, after the raw materials are dispersed into an organic solvent, the resultant material is mixed by using a mortar, a ball mill, a bead mill, a planetary ball mill, a vibrating ball mill, a sand mill, and a film mix, and then the solvent is removed. Above all, wet mixing is preferable because negative electrode active material particles are not destroyed.

Positive Electrode Mix

The positive electrode mix can be obtained by blending the positive electrode active material in the solid electrolyte of the invention.

The positive electrode active material is a material capable of inserting or eliminating a lithium ion into or from the material, and a publicly-known material as the positive electrode active material in the field of a battery can be used. Further, a positive electrode active material that will be developed in the future can also be used.

Examples of the positive electrode active material include metal oxide and sulfide. The sulfide includes metal sulfide and nonmetal sulfide.

The metal oxide is transition metal oxide, for example. Specific examples include $V_2O_5$, $V_6O_{13}$, $LiCoO_2$, $LiNiO_2$, $LiMnO_2$, $LiMn_2O_4$, $Li(Ni_aCo_bMn_c)O_2$ (in which, $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (in which, $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (in which, $0<Z<2$), $LiCoPO_4$, $LiFePO_4$, $CuO$, and $Li(Ni_aCo_bAl_c)O_2$ (in which, $0<a<1$, $0<b<1$, $0<c<1$, $a+b+c=1$).

Examples of the metal sulfide include titanium sulfide ($TiS_2$), molybdenum sulfide ($MoS_2$), iron sulfide ($FeS$, $FeS_2$), copper sulfide ($CuS$), and nickel sulfide ($Ni_3S_2$).

In addition to thereto, examples of the metal oxide include bismuth oxide ($Bi_2O_3$), and bismuth-lead oxide ($Bi_2Pb_2O_5$).

Examples of the nonmetal sulfide include an organic disulfide compound and a carbon sulfide compound.

In addition to the materials described above, niobium selenide ($NbSe_3$), metal indium, or sulfur can also be used as the positive electrode active material.

The positive electrode mix may further contain the conductive additive.

The conductive additive is the same as in the negative electrode mix.

A blending ratio of the solid electrode and the positive electrode active material of the positive electrode mix, a content of the conductive additive and a method for producing the positive electrode mix are the same as in the above-described negative electrode mix.

[Lithium Ion Battery]

The lithium ion battery according to one embodiment of the invention includes at least one of the sulfide solid electrolyte and the electrode mix of the invention as described above, or is produced from at least one of the sulfide solid electrolyte and the electrode mix of the invention.

A configuration of the lithium ion battery is not particularly limited, but generally has a structure in which a negative electrode layer, an electrolyte layer and a positive electrode layer are stacked in this order. Hereinafter, each layer of the lithium ion battery will be described.

(1) Negative Electrode Layer

The negative electrode layer is preferably a layer produced from the negative electrode mix according to one embodiment of the invention.

Alternatively, the negative electrode layer is preferably a layer including the negative electrode mix according to one embodiment of the invention.

A thickness of the negative electrode layer is preferably 100 nm or more and 5 mm or less, more preferably 1 μm or more and 3 mm or less, and further preferably 5 μm or more and 1 mm or less.

The negative electrode layer can be produced by a publicly-known method, for example, by a coating method, or an electrostatic method (an electrostatic spray method, an electrostatic screen method, or the like).

(2) Electrolyte Layer

The electrolyte layer is a layer including the solid electrolyte or a layer produced from the solid electrolyte. The solid electrolyte is not particularly limited, but is preferably the sulfide solid electrolyte according to the invention.

The electrolyte layer may consist essentially of the solid electrolyte, or may further include a binder. As the binder, the same binder as the binder in the negative electrode mix of the invention can be used.

A thickness of the electrolyte layer is preferably 0.001 mm or more and 1 mm or less.

The solid electrolyte of the electrolyte layer may be fused. A term "fused" means that part of solid electrolyte particles is melted and a melted part is integrated with other solid electrolyte particles. Further, the electrolyte layer may be formed in a plate-like body of the solid electrolyte, in which the plate-like body includes a case where the solid electrolyte particles are partly or wholly melted into the plate-like body.

The electrolyte layer can be produced by a publicly-known method, for example, by a coating method or an electrostatic method (an electrostatic spray method, an electrostatic screen method, or the like).

(3) Positive Electrode Layer

The positive electrode layer is a layer including the positive electrode active material, and preferably a layer including the positive electrode mix of the invention or a layer produced from the positive electrode mix of the invention.

A thickness of the positive electrode layer is preferably 0.01 mm or more and 10 mm or less.

The positive electrode layer can be produced by a publicly-known method, for example, by a coating method, an electrostatic method (an electrostatic spray method, an electrostatic screen method, or the like).

(4) Current Collector

The lithium ion battery of this embodiment preferably further includes a current collector. For example, a negative electrode current collector is provided on a side opposite to a side of the electrolyte layer of the negative electrode layer, and a positive electrode current collector is provided on a side opposite to the side of the electrolyte layer of the positive electrode layer.

As the current collector, a plate-like body or a foil-like body, or the like formed of copper, magnesium, stainless steel, titanium, iron, cobalt, nickel, zinc, aluminum, germanium, indium, lithium or an alloy thereof, or the like can be used.

The lithium ion battery of this embodiment can be produced by laminating and bonding the respective members described above. Examples of a method for bonding the members include a method in which the respective members are stacked, pressurized and pressure-bonded, and a method in which the members are pressurized by passing through two rolls (roll-to-roll method).

Further, the members may be bonded through an active material having ion conductivity or an adhesive substance that does not adversely affect the ion conductivity on a bonding surface.

In the bonding, the members may be heated and fused within the range in which the crystal structure of the solid electrolyte is not changed.

Further, the lithium ion battery of this embodiment can also be produced by sequentially forming the respective members described above. The lithium ion battery can be produced by a publicly-known method, for example, by a coating method, an electrostatic method (an electrostatic spray method, an electrostatic screen method, or the like).

EXAMPLES

Hereinafter, the invention will be described in more detail by Examples.

In addition, an evaluation method is as follows.
(1) Ion Conductivity and Electron Conductivity Measurement A sulfide solid electrolyte produced in each example was filled in tableting machinery and a pressure of 407 MPa (press indicated value: 22 MPa) was applied by using a mini press machine, and the resultant material was taken as a molded body. As an electrode, carbon was placed on both surfaces of the molded body, and pressure was applied again by the tableting machinery to prepare a molded body for measurement (diameter: about 10 mm, thickness: 0.1 to 0.2 cm). Ion conductivity was measured on this molded body by AC impedance measurement. As a value of the ion conductivity, a numerical value at 25° C. was adopted.

In addition, in the method for measuring the ion conductivity used in this Example, in a case where the ion conductivity is less than $1.0 \times 10^{-6}$ S/cm, the ion conductivity was unable to be accurately measured, and therefore such a case was deemed as unmeasurable.

Further, electron conductivity was measured on this molded body by DC electricity measurement. As a value of the electron conductivity, a numerical value at 25° C. was adopted. In addition, when the electron conductivity upon applying a voltage of 5 V was less than $1.0 \times 10^{-6}$ S/cm, the electron conductivity was deemed as unmeasurable.
(2) X-Ray Diffraction (XRD) Measurement A circular pellet having a diameter of 10 mm and a height of 0.1 to 0.3 cm was molded from powder of the sulfide solid electrolyte produced in each example, and the resultant molded body was applied as a sample. This sample was measured using an air-tight holder for XRD by avoiding contacting with air. A position of a diffraction peak at $2\theta$ was determined by a centroid method using an XRD analysis program JADE.

Measurement was conducted using Powder X-ray Diffractometer SmartLab manufactured by Rigaku Corporation under the following conditions.

Tube voltage: 45 kV
Tube current: 200 mA
X-ray wavelength: CuKα rays (1.5418 Å)
Optical system: Parallel beam system
Slit configuration: solar slit 5°, incident slit: 1 mm, light receiving slit: 1 mm
Detector: scintillation counter
Measurement range: $2\theta$=10 to 60 deg
Step width, scan speed: 0.02 deg, 1 deg/min In an analysis of a peak position for confirming presence of a crystal structure from the measurement results, the peak position was determined by drawing a baseline by cubic approximation using the XRD analysis program JADE.

In intensity of the peak, a ratio of intensity was calculated by analyzing intensity of one peak of an argyrodite-type crystal structure existing at $2\theta$=29.7 deg±0.5 deg and intensity of two peaks of a $Li_3PS_4$ crystal structure existing at $2\theta$=17.6±0.4 deg and 18.1±0.4 deg according to the following procedure.

Smoothing was conducted by a moving average of data of 5 points of measured data, and a lowest intensity point between 17.5 to 18.5 deg was taken as a background and subtracted from the measured data. Then, a maximum value of measured data between maximum values of measured data at 17.0 to 17.8 deg and 17.9 to 18.5 deg was calculated, and intensity of a smaller peak was used as intensity of the peak of the $Li_3PS_4$ crystal structure. Further, intensity of the peak of the argyrodite-type crystal structure was calculated by applying a maximum value of measured data at 29.0 to 32.0 deg as the intensity of the peak.
(3) ICP Measurement Powder of the sulfide solid electrolyte produced in each example was weighed and collected in a vial bottle in an argon atmosphere. A KOH alkaline aqueous solution was put in the vial bottle, and the sample was dissolved while paying attention to no capturing of a sulfur content, and appropriately diluted, and the resultant material was applied as a measurement solution. This solution was measured with a Paschen Runge-type ICP-OES system (SPECTRO ARCOS, manufactured by SPECTRO), and a composition was determined.

Solutions for calibration curve were prepared by using a 1000 mg/L standard solution for ICP measurement for Li, P, S, Ge, and Si, a 1000 mg/L standard solution for ion chromatography for Cl and Br, and potassium iodide (guaranteed reagent) for I.

Two measurement solutions were prepared in each sample, five-time measurements were performed using each measurement solution, and an average value was calculated. The composition was determined by an average of measured values of the two measurement solutions.

Production Example 1

(Production of Lithium Sulfide ($Li_2S$))

In a 500 mL separable flask equipped with a stirrer, 200 g of LiOH anhydrous (manufactured by Honjo Chemical Co., Ltd.) dried under an inert gas was put. Temperature was raised under a nitrogen stream, and held at 200° C. in an internal temperature. A nitrogen gas was switched to a hydrogen sulfide gas (SUMITOMO SEIKA CHEMICALS CO., LTD.), and a flow rate of the gas was adjusted to 500 mL/min to react LiOH anhydrous and hydrogen sulfide.

Moisture generated by the reaction was condensed by a condenser and collected. At a time-point of performing the reaction for 6 hours, 144 mL of water was collected. The reaction was further continued for 3 hours, but no water generation was observed.

Product powder was collected and purity and XRD were measured. As a result, the purity was 98.5%, and in XRD, a peak pattern of $Li_2S$ was able to be confirmed in XRD.

Example 1

The lithium sulfide (purity: 98.5%) produced in Production Example 1, phosphorus pentasulfide (manufactured by Thermophos International, purity: 99.9% or more), lithium chloride (manufactured by Sigma-Aldrich Co. LLC, purity: 99%) and lithium bromide (manufactured by Sigma-Aldrich Co. LLC; purity: 99%) were used as starting raw materials (hereinafter, the purity of each starting raw material was the same in all Examples). The respective raw materials were mixed to be 47.5:12.5:30:10 in a molar ratio ($Li_2S:P_2S_5$:LiCl:LiBr) for lithium sulfide ($Li_2S$), phosphorus pentasulfide ($P_2S_5$), lithium chloride (LiCl) and lithium bromide (LiBr). Specifically, 0.461 g of lithium sulfide, 0.587 g of phosphorus pentasulfide, 0.269 g of lithium chloride and 0.183 g of lithium bromide were mixed, and the resultant mixture was taken as a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7), and completely sealed. An inside of the pot was adjusted to an argon atmosphere. The raw material mixture was treated (mechanical milling) by the planetary ball mill for 48 hours by adjusting the number of revolutions to 370 rpm to obtain glassy powder (intermediate).

About 1.5 g of powder of the above-described intermediate was filled in a Tammann tube (PT2, manufactured by Tokyo Glass Instruments Co., Ltd.) in a glove box under an argon atmosphere, and a mouth of the Tammann tube was closed with quartz wool, and the tube was further sealed in a SUS closed container so as to prevent entry of air. Then, the closed container was placed in an electric furnace (FUW243PA, manufactured by AdvanTech Co., Ltd.), and the powder was heat-treated. Specifically, temperature was raised from room temperature to 500° C. at a rate of 2.5° C./min (heated to 500° C. in 3 hours), and held at 500° C. for 10 hours. Then, the powder was gradually cooled to obtain a sulfide solid electrolyte.

Ion conductivity ($\sigma$) of the sulfide solid electrolyte was 7.9 mS/cm. In addition, electron conductivity was less than $10^{-6}$ S/cm.

Figure 1:
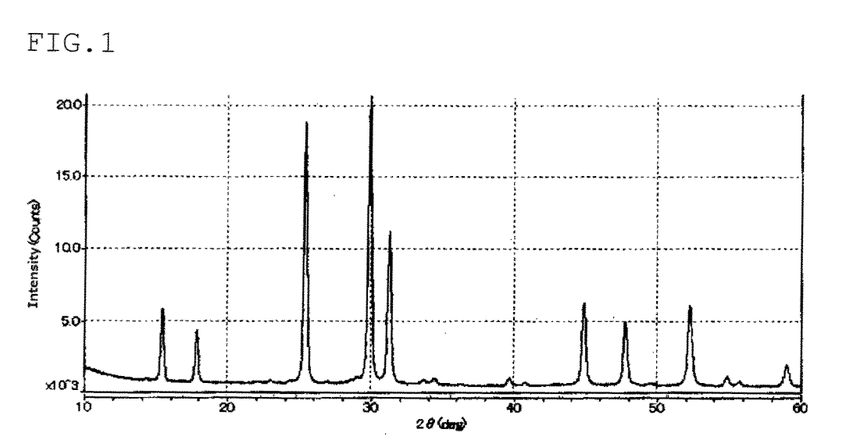
FIG. 1 is an X-ray diffraction pattern of the sulfide solid electrolyte obtained in Example 1.

An XRD pattern of the sulfide solid electrolyte is shown in FIG. 1. Peaks arising from an argyrodite-type crystal structure were observed at $2\theta=15.4$, 17.8, 25.4, 29.9, 31.3, 44.9, 47.8, and 52.3 deg. On the other hand, a peak arising from a $Li_3PS_4$ crystal structure was not observed.

An ICP analysis was conducted on the sulfide solid electrolyte, and a molar ratio of each element was measured. Further, the ion conductivity a was also measured. The results are shown in Table 1.

TABLE 1

| | Molar ratio of each element to phosphorus | | | | | | |
|---|---|---|---|---|---|---|---|
| | a (Li/P) | b (S/P) | c1 (Cl/P) | c2 (Br/P) | (Cl + Br)/S [(c1 + c2)/b] | Cl/(Cl + Br) [c1/(c1 + c2)] | σ (mS/cm) |
| Ex. 1 | 5.3 | 4.3 | 1.31 | 0.41 | 0.40 | 0.76 | 7.9 |
| Ex. 2 | 5.3 | 4.3 | 1.45 | 0.22 | 0.39 | 0.87 | 8.5 |
| Ex. 3 | 5.3 | 4.3 | 1.50 | 0.18 | 0.39 | 0.89 | 9.0 |
| Ex. 4 | 5.7 | 4.7 | 0.92 | 0.35 | 0.27 | 0.73 | 6.9 |
| Ex. 5 | 5.7 | 4.7 | 1.20 | 0.29 | 0.32 | 0.81 | 8.0 |
| Ex. 6 | 5.7 | 4.7 | 1.31 | 0.15 | 0.31 | 0.90 | 9.1 |
| Ex. 7 | 5.7 | 4.7 | 1.52 | 0.03 | 0.33 | 0.98 | 7.3 |
| Ex. 8 | 5.6 | 4.5 | 0.98 | 0.30 | 0.29 | 0.77 | 7.3 |
| Ex. 9 | 5.6 | 4.6 | 1.10 | 0.21 | 0.28 | 0.84 | 7.7 |
| Ex. 10 | 5.6 | 4.6 | 1.15 | 0.13 | 0.28 | 0.90 | 7.9 |
| Ex. 11 | 5.4 | 4.4 | 1.39 | 0.20 | 0.36 | 0.87 | 11.5 |
| Ex. 12 | 5.4 | 4.4 | 1.20 | 0.41 | 0.37 | 0.75 | 12.5 |
| Ex. 13 | 5.4 | 4.4 | 1.01 | 0.60 | 0.37 | 0.63 | 13.0 |
| Ex. 14 | 5.3 | 4.3 | 0.79 | 0.81 | 0.37 | 0.49 | 9.1 |
| Ex. 15 | 5.4 | 4.4 | 0.60 | 1.00 | 0.36 | 0.38 | 8.8 |
| Ex. 16 | 5.4 | 4.4 | 1.04 | 0.60 | 0.38 | 0.63 | 11.8 |
| Ex. 17 | 5.4 | 4.4 | 1.00 | 0.61 | 0.37 | 0.62 | 10.5 |
| Ex. 18 | 5.4 | 4.4 | 0.99 | 0.60 | 0.36 | 0.62 | 12.1 |
| Comp. Ex. 1 | 6.0 | 4.9 | 0.75 | 0.29 | 0.21 | 0.72 | 5.1 |

Abbreviations) Ex.: Example, Comp. Ex.: Comparative Example

Examples 2 to 15 and Comparative Example 1

A sulfide solid electrolyte was prepared and evaluated in the same manner as in Example 1 except that raw material compositions and preparation conditions were changed as shown in Table 2. The results are shown in Table 1.

In addition, all the sulfide solid electrolytes had electron conductivity less than $10^{-6}$ S/cm. Further, as a result of an XRD measurement, a peak arising from an argyrodite-type crystal structure was observed.

Figure 2:
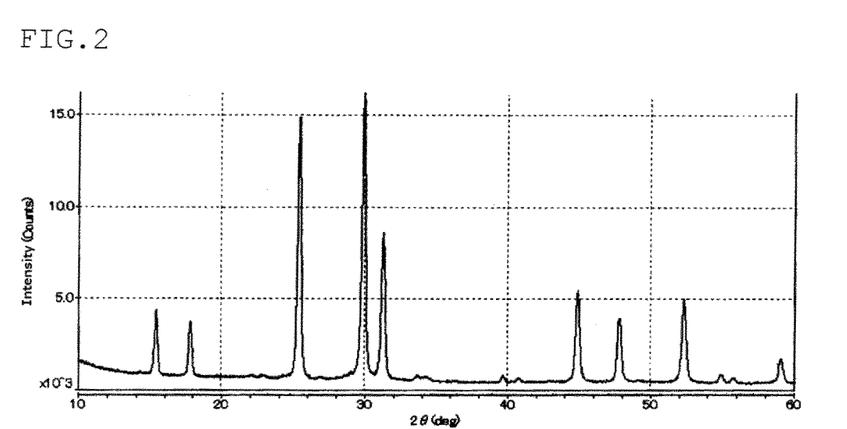
FIG. 2 is an X-ray diffraction pattern of the sulfide solid electrolyte obtained in Example 4.

An XRD pattern of the sulfide solid electrolyte obtained in Example 4 is shown in FIG. 2. Peaks arising from the argyrodite-type crystal structure were observed at $2\theta=15.4$, 17.8, 25.4, 29.9, 31.3, 44.9, 47.7, and 52.3 deg.

Example 16

An intermediate was prepared in the same manner as in Example 1 except that raw material compositions and preparation conditions were changed as shown in Table 2.

In a glove box in an atmosphere of argon, about 1.5 g of powder of the intermediate was filled in a glass tube provided with a sealing function, and an end of the glass tube was sealed with a dedicated jig so as to avoid entry of air. Then, the glass tube was set in an electric furnace. The dedicated jig was inserted into a joint in the electric furnace, and the glass tube was connected with a glass circulation tube, and heat treatment was applied while circulating hydrogen sulfide at a flow rate of 0.5 L/min. Specifically, temperature was raised from room temperature to 500° C. at a rate of 3° C./min, and held at 500° C. for 4 hours. Then, the resultant material was gradually cooled to obtain a sulfide solid electrolyte.

The thus obtained sulfide solid electrolyte was evaluated in the same manner as in Example 1. The results are shown in Table 1. In addition, the sulfide solid electrolyte obtained in Example 16 also had electron conductivity less than $10^{-6}$ S/cm. Further, as a result of an XRD measurement, a peak arising from an argyrodite-type crystal structure was observed.

Example 17

In Example 17, kneading using a twin screw kneader in place of MM treatment in Example 1 was conducted for preparation of an intermediate. Kneading using the twin screw kneader was specifically conducted as follows.

A feeder (manufactured by Aisin Nanotechnologies Co., Ltd., microfeeder) and a twin screw kneading extruder (manufactured by Kuritomo Ltd., KRC kneader, paddle diameter φ: 8 mm) were installed in a glove box. A mixture of 1.447 g of LiCl, 1.779 g of LiBr, 2.980 g of $Li_2S$ and 3.794 g of $P_2S_5$ was fed from a feed unit by a feeder at a constant rate, and kneaded at the number of revolutions of 150 rpm at a temperature of 250° C. (measured on an outer surface of a casing of the twin screw kneading extruder with a thermometer). Powder was discharged from a kneader outlet in about 120 minutes. The discharged powder was returned to the feed unit again, and operation of kneading the raw materials was repeated 5 times. A reaction time was about 10 hours in total.

The thus obtained intermediate was heat-treated at 430° C. for 4 hours in the same manner as in Example 1 to obtain a sulfide solid electrolyte.

The thus obtained sulfide solid electrolyte was evaluated in the same manner as in Example 1. The results are shown in Table 1.

In addition, the sulfide solid electrolyte obtained in Example 17 had electron conductivity less than $10^{-6}$ S/cm. Further, as a result of an XRD measurement, a peak arising from an argyrodite-type crystal structure was observed.

Example 18

A sulfide solid electrolyte was prepared by using a twin screw kneader in the same manner as in Example 17 and evaluated in the same manner as in Example 1 except that raw material compositions and preparation conditions were changed as shown in Table 2. The results are shown in Table 1.

In addition, the sulfide solid electrolyte obtained in Example 18 had electron conductivity less than $10^{-6}$ S/cm. Further, as a result of an XRD measurement, a peak arising from an argyrodite-type crystal structure was observed.

TABLE 2

| | Amount of raw materials blended (g) | | | | MM treatment conditions | | Heat treatment conditions | | |
|---|---|---|---|---|---|---|---|---|---|
| | | | | | Number of revolutions | Time | Presence or | Temperature | Time |
| | $Li_2S$ | $P_2S_5$ | LiCl | LiBr | (rpm) | (H) | absence of $H_2S$ | (° C.) | (H) |
| Ex. 1 | 0.461 | 0.587 | 0.269 | 0.183 | 370 | 48 | Absence | 500 | 10 |
| Ex. 2 | 0.476 | 0.606 | 0.324 | 0.095 | 370 | 48 | Absence | 500 | 10 |
| Ex. 3 | 0.479 | 0.610 | 0.335 | 0.076 | 370 | 48 | Absence | 500 | 10 |
| Ex. 4 | 0.504 | 0.595 | 0.238 | 0.163 | 370 | 48 | Absence | 500 | 10 |
| Ex. 5 | 0.512 | 0.604 | 0.265 | 0.118 | 370 | 48 | Absence | 500 | 10 |
| Ex. 6 | 0.522 | 0.615 | 0.296 | 0.067 | 370 | 48 | Absence | 500 | 10 |
| Ex. 7 | 0.532 | 0.628 | 0.330 | 0.010 | 370 | 48 | Absence | 500 | 10 |
| Ex. 8 | 0.556 | 0.598 | 0.205 | 0.140 | 370 | 48 | Absence | 500 | 10 |
| Ex. 9 | 0.565 | 0.608 | 0.232 | 0.095 | 370 | 48 | Absence | 500 | 10 |
| Ex. 10 | 0.573 | 0.616 | 0.254 | 0.058 | 370 | 48 | Absence | 500 | 10 |
| Ex. 11 | 0.476 | 0.606 | 0.324 | 0.095 | 370 | 48 | Absence | 440 | 4 |
| Ex. 12 | 0.461 | 0.587 | 0.269 | 0.183 | 370 | 48 | Absence | 430 | 4 |
| Ex. 13 | 0.447 | 0.569 | 0.217 | 0.267 | 370 | 48 | Absence | 420 | 4 |
| Ex. 14 | 0.434 | 0.552 | 0.169 | 0.345 | 370 | 48 | Absence | 430 | 4 |
| Ex. 15 | 0.421 | 0.537 | 0.123 | 0.419 | 370 | 48 | Absence | 430 | 4 |
| Ex. 16 | 0.436 | 0.569 | 0.228 | 0.267 | 370 | 48 | Existence | 500 | 4 |
| Ex. 17 | 2.980 | 3.794 | 1.447 | 1.779 | — | — | Absence | 430 | 4 |
| Ex. 18 | 2.980 | 3.794 | 1.447 | 1.779 | — | — | Absence | 430 | 48 |
| Comp. Ex. 1 | 0.614 | 0.595 | 0.166 | 0.125 | 370 | 48 | Absence | 500 | 10 |

Abbreviations) Ex.: Example, Comp. Ex.: Comparative Example

A ratio of intensity of peaks of lithium halide and a ratio of intensity of peaks of a $Li_3PS_4$ crystal structure in XRD were measured on the sulfide solid electrolytes produced in Examples 11 to 18 and Comparative Example 1. The results are shown in Table 3.

TABLE 3

| | Ratio $(I_A/I_B)*$ of intensity of lithium halide peak | Ratio $(I_C/I_D)*$ of intensity of $Li_3PS_4$ peak |
|---|---|---|
| Ex. 11 | 0.012 | 0.000 |
| Ex. 12 | 0.009 | 0.000 |
| Ex. 13 | 0.008 | 0.000 |
| Ex. 14 | 0.008 | 0.000 |
| Ex. 15 | 0.012 | 0.000 |
| Ex. 16 | 0.009 | 0.000 |
| Ex. 17 | 0.013 | 0.000 |

TABLE 3-continued

| | Ratio $(I_A/I_B)^*$ of intensity of lithium halide peak | Ratio $(I_C/I_D)^*$ of intensity of Li$_3$PS$_4$ peak |
|---|---|---|
| Ex. 18 | 0.007 | 0.000 |
| Comp. Ex. 1 | 0.101 | 0.000 |

Abbreviations)
Ex.: Example,
Comp. Ex.: Comparative Example

In Table 3, $I_B$ is intensity of a diffraction peak at 2θ=25.2±0.5 deg, and $I_A$ is a total of intensity of diffraction peaks (intensity of a diffraction peak of LiCl) at 2θ=50.3±0.5 deg and (intensity of a diffraction peak of LiBr) at 2θ=46.7±0.5 deg. $I_C$ is intensity of a diffraction peak that is not a diffraction peak arising from an argyrodite-type crystal structure between diffraction peaks at 2θ=17.6±0.4 deg and 2θ=18.1±0.4 deg. ID is intensity of a diffraction peak at 2θ=29.7±0.5 deg.

Examples 19 to 44 and Comparative Examples 2 to 6

A sulfide solid electrolyte was prepared and evaluated in the same manner as in Example 1 except that raw material compositions and preparation conditions were changed as shown in Table 4 or Table 6. The results are shown in Table 5 or Table 7.

In addition, all the sulfide solid electrolytes had electron conductivity less than $10^{-6}$ S/cm. Further, as a result of an XRD measurement, a peak arising from an argyrodite-type crystal structure was observed.

TABLE 4

| | Amount of raw materials blended (g) | | | | MM treatment conditions | | Heat treatment conditions | |
|---|---|---|---|---|---|---|---|---|
| | | | | | Number of revolutions | Time | Presence or absence of | Temperature | Time |
| | Li$_2$S | P$_2$S$_5$ | LiCl | LiBr | (rpm) | (H) | H$_2$S | (° C.) | (H) |
| Ex. 19 | 0.484 | 0.616 | 0.352 | 0.048 | 370 | 48 | Absence | 430 | 4 |
| Ex. 20 | 0.399 | 0.507 | 0.039 | 0.555 | 370 | 48 | Absence | 430 | 4 |
| Ex. 21 | 0.475 | 0.621 | 0.355 | 0.049 | 370 | 48 | Absence | 430 | 4 |
| Ex. 22 | 0.459 | 0.617 | 0.376 | 0.048 | 370 | 48 | Absence | 430 | 4 |
| Ex. 23 | 0.355 | 0.476 | 0.036 | 0.633 | 370 | 48 | Absence | 430 | 4 |
| Ex. 24 | 0.421 | 0.537 | 0.123 | 0.419 | 370 | 48 | Absence | 430 | 4 |
| Ex. 25 | 0.486 | 0.559 | 0.149 | 0.306 | 370 | 48 | Absence | 430 | 4 |
| Ex. 26 | 0.539 | 0.566 | 0.130 | 0.266 | 370 | 48 | Absence | 430 | 4 |
| Ex. 27 | 0.426 | 0.557 | 0.170 | 0.348 | 370 | 48 | Absence | 430 | 4 |
| Ex. 28 | 0.434 | 0.552 | 0.169 | 0.345 | 370 | 48 | Absence | 430 | 4 |
| Ex. 29 | 0.412 | 0.553 | 0.190 | 0.346 | 370 | 48 | Absence | 430 | 4 |
| Ex. 30 | 0.465 | 0.535 | 0.082 | 0.418 | 370 | 48 | Absence | 430 | 4 |
| Ex. 31 | 0.583 | 0.613 | 0.257 | 0.048 | 370 | 48 | Absence | 430 | 4 |
| Ex. 32 | 0.523 | 0.550 | 0.084 | 0.344 | 370 | 48 | Absence | 430 | 4 |
| Ex. 33 | 0.461 | 0.531 | 0.071 | 0.436 | 370 | 48 | Absence | 430 | 4 |
| Ex. 34 | 0.508 | 0.534 | 0.041 | 0.417 | 370 | 48 | Absence | 430 | 4 |
| Ex. 35 | 0.399 | 0.507 | 0.039 | 0.555 | 370 | 48 | Existence | 430 | 4 |
| Ex. 36 | 0.383 | 0.546 | 0.187 | 0.384 | 370 | 48 | Absence | 430 | 4 |
| Ex. 37 | 0.459 | 0.617 | 0.376 | 0.048 | 370 | 48 | Absence | 430 | 4 |
| Ex. 38 | 0.451 | 0.607 | 0.347 | 0.095 | 370 | 48 | Absence | 430 | 4 |
| Ex. 39 | 0.400 | 0.537 | 0.143 | 0.420 | 370 | 48 | Absence | 430 | 4 |

Abbreviations) Ex.: Example, Comp. Ex. Comparative Example

TABLE 5

| | Molar ratio of each element to phosphorus | | | | | | |
|---|---|---|---|---|---|---|---|
| | a (Li/P) | b (S/P) | c1 (Cl/P) | c2 (Br/P) | (Cl + Br)/S [(c1 + c2)/b] | Cl/(Cl + Br) [c1/(c1 + c2)] | σ (mS/cm) |
| Ex. 19 | 5.4 | 4.4 | 1.5 | 0.1 | 0.36 | 0.94 | 10.8 |
| Ex. 20 | 5.4 | 4.4 | 0.2 | 1.4 | 0.36 | 0.13 | 7.5 |
| Ex. 21 | 5.3 | 4.35 | 1.5 | 0.1 | 0.37 | 0.94 | 10.9 |
| Ex. 22 | 5.2 | 4.3 | 1.6 | 0.1 | 0.40 | 0.94 | 9.4 |
| Ex. 23 | 5.2 | 4.3 | 0.2 | 1.5 | 0.40 | 0.12 | 7.2 |
| Ex. 24 | 5.4 | 4.4 | 0.6 | 1.0 | 0.36 | 0.38 | 12.9 |
| Ex. 25 | 5.6 | 4.6 | 0.7 | 0.7 | 0.30 | 0.50 | 8.9 |
| Ex. 26 | 5.8 | 4.8 | 0.6 | 0.6 | 0.25 | 0.50 | 7.0 |
| Ex. 27 | 5.3 | 4.35 | 0.8 | 0.8 | 0.37 | 0.50 | 11.2 |
| Ex. 28 | 5.2 | 4.3 | 0.8 | 0.8 | 0.37 | 0.50 | 11.0 |
| Ex. 29 | 5.5 | 4.4 | 0.9 | 0.8 | 0.39 | 0.53 | 8.9 |
| Ex. 30 | 5.6 | 4.6 | 0.4 | 1.0 | 0.30 | 0.29 | 8.2 |
| Ex. 31 | 5.8 | 4.8 | 1.1 | 0.1 | 0.25 | 0.92 | 7.1 |
| Ex. 32 | 5.8 | 4.8 | 0.4 | 0.8 | 0.25 | 0.33 | 7.1 |
| Ex. 33 | 5.7 | 4.7 | 0.35 | 1.05 | 0.30 | 0.25 | 7.2 |
| Ex. 34 | 5.6 | 4.6 | 0.23 | 1.0 | 0.27 | 0.19 | 7.3 |
| Ex. 35 | 5.4 | 4.4 | 0.2 | 1.4 | 0.36 | 0.13 | 7.4 |
| Ex. 36 | 5.2 | 4.2 | 0.9 | 0.9 | 0.43 | 0.50 | 7.7 |

TABLE 5-continued

| | Molar ratio of each element to phosphorus | | | | | |
|---|---|---|---|---|---|---|
| | a (Li/P) | b (S/P) | c1 (Cl/P) | c2 (Br/P) | (Cl + Br)/S [(c1 + c2)/b] | Cl/(Cl + Br) [c1/(c1 + c2)] | σ (mS/cm) |
| Ex. 37 | 5.3 | 4.3 | 1.6 | 0.1 | 0.40 | 0.94 | 9.9 |
| Ex. 38 | 5.3 | 4.3 | 1.5 | 0.2 | 0.40 | 0.88 | 10.8 |
| Ex. 39 | 5.3 | 4.3 | 0.7 | 1.0 | 0.40 | 0.41 | 10.2 |

Abbreviations) Ex.: Example, Comp. Ex. Comparative Example

TABLE 6

| | Amount of raw materials blended (g) | | | | MM treatment conditions | | Heat treatment conditions | | |
|---|---|---|---|---|---|---|---|---|---|
| | | | | | Number of revolutions | Time | Presence or absence of | Temperature | Time |
| | $Li_2S$ | $P_2S_5$ | LiCl | LiBr | (rpm) | (H) | $H_2S$ | (° C.) | (H) |
| Ex. 40 | 0.427 | 0.607 | 0.371 | 0.095 | 370 | 48 | Absence | 430 | 4 |
| Ex. 41 | 0.415 | 0.628 | 0.452 | 0.005 | 370 | 48 | Absence | 430 | 4 |
| Ex. 42 | 0.324 | 0.489 | 0.037 | 0.650 | 370 | 48 | Absence | 430 | 4 |
| Ex. 43 | 0.419 | 0.633 | 0.423 | 0.025 | 370 | 48 | Absence | 430 | 4 |
| Ex. 44 | 0.329 | 0.513 | 0.098 | 0.561 | 370 | 48 | Absence | 430 | 4 |
| Comp. Ex. 2 | 0.593 | 0.574 | 0.109 | 0.224 | 370 | 48 | Absence | 430 | 4 |
| Comp. Ex. 3 | 0.566 | 0.570 | 0.120 | 0.245 | 370 | 48 | Absence | 430 | 4 |
| Comp. Ex. 4 | 0.541 | 0.545 | 0.052 | 0.362 | 370 | 48 | Absence | 430 | 4 |
| Comp. Ex. 5 | 0.612 | 0.617 | 0.247 | 0.024 | 370 | 48 | Absence | 430 | 4 |
| Comp. Ex. 6 | 0.348 | 0.561 | 0.064 | 0.526 | 370 | 48 | Absence | 430 | 4 |

Abbreviations) Ex.: Example, Comp. Ex. Comparative Example

TABLE 7

| | Molar ratio of each element to phosphorus | | | | | | |
|---|---|---|---|---|---|---|---|
| | a (Li/P) | b (S/P) | c1 (Cl/P) | c2 (Br/P) | (Cl + Br)/S [(c1 + c2)/b] | Cl/(Cl + Br) [c1/(c1 + c2)] | σ (mS/cm) |
| Ex. 40 | 5.2 | 4.2 | 1.60 | 0.20 | 0.43 | 0.89 | 7.1 |
| Ex. 41 | 5.1 | 4.1 | 1.89 | 0.01 | 0.46 | 0.99 | 7.0 |
| Ex. 42 | 5.1 | 4.1 | 0.20 | 1.70 | 0.46 | 0.11 | 7.1 |
| Ex. 43 | 5.0 | 4.2 | 1.75 | 0.05 | 0.43 | 0.97 | 7.2 |
| Ex. 44 | 5.0 | 4.2 | 0.50 | 1.40 | 0.45 | 0.26 | 7.0 |
| Comp. Ex. 2 | 6.0 | 5.0 | 0.50 | 0.50 | 0.20 | 0.50 | 4.9 |
| Comp. Ex. 3 | 5.9 | 4.9 | 0.55 | 0.55 | 0.22 | 0.50 | 5.4 |
| Comp. Ex. 4 | 5.9 | 4.9 | 0.25 | 0.85 | 0.22 | 0.23 | 5.3 |
| Comp. Ex. 5 | 5.9 | 4.9 | 1.05 | 0.05 | 0.22 | 0.95 | 5.4 |
| Comp. Ex. 6 | 5.0 | 2.6 | 0.30 | 1.20 | 0.58 | 0.20 | 5.3 |

Abbreviations) Ex.: Example, Comp. Ex.: Comparative Example

Example 45

The lithium sulfide, the phosphorus pentasulfide, the lithium chloride and the lithium bromide which were used in Example 1, and lithium iodide (LiI: manufactured by Sigma-Aldrich Co. LLC, purity: 99%) were used as starting raw materials. The respective raw materials were mixed to be 47.5:12.5:25.0:12.5:2.5 in a molar ratio ($Li_2S:P_2S_5:LiCl:LiBr:LiI$). Specifically, 0.440 g of lithium sulfide, 0.560 g of phosphorus pentasulfide, 0.214 g of lithium chloride, 0.219 g of lithium bromide and 0.067 g of lithium iodide were mixed, and the resultant mixture was taken as a raw material mixture.

A sulfide solid electrolyte was prepared in the same manner as in Example 19 except that raw material mixtures were changed.

Then, σ of the sulfide solid electrolyte was 11.0 mS/cm. In addition, electron conductivity was less than $10^{-6}$ S/cm.

As a result of an XRD measurement, a peak arising from an argyrodite-type crystal structure was observed.

As a result of an ICP analysis, a molar ratio b (S/P) was 4.3, a molar ratio c ((Cl+Br+1)/P) was 1.6, and a ratio: c/b was 0.37.

Example 46

The lithium sulfide, the phosphorus pentasulfide, the lithium chloride and the lithium bromide which were used in Example 1, and germanium (IV) sulfide ($GeS_2$: manufactured by Kojundo Chemical Laboratory Co., Ltd., purity: 99%) were used as starting raw materials. The respective raw materials were mixed to be 46.9:11.1:2.5:24.7:14.8 in a molar ratio ($Li_2S:P_2S_5:GeS_2: LiCl: LiBr$). Specifically, 0.443 g of lithium sulfide, 0.508 g of phosphorus pentasulfide, 0.069 g of germanium(IV) sulfide, 0.215 g of lithium chloride and 0.264 g of lithium bromide were mixed, and the resultant mixture was taken as a raw material mixture.

A sulfide solid electrolyte was prepared in the same manner as in Example 19 except that raw material mixtures were changed.

Then, σ of the sulfide solid electrolyte was 9.8 mS/cm. In addition, electron conductivity was less than $10^{-6}$ S/cm.

As a result of an XRD measurement, a peak arising from an argyrodite-type crystal structure was observed.

As a result of an ICP analysis, a molar ratio b (S/(P+Ge)) was 4.3, a molar ratio c ((Cl+Br)/(P+Ge)) was 1.6, and a ratio: c/b was 0.37.

Example 47

The lithium sulfide, the phosphorus pentasulfide, the lithium chloride and the lithium bromide which were used in Example 1, and silicon disulfide ($SiS_2$: manufactured by Kojundo Chemical Laboratory Co., Ltd.) were used as starting raw materials. The respective raw materials were mixed to be 46.9:11.1:2.5:24.7:14.8 in a molar ratio ($Li_2S$: $P_2S_5$:$SiS_2$:LiCl:LiBr). Specifically, 0.450 g of lithium sulfide, 0.515 g of phosphorus pentasulfide, 0.048 g of silicon disulfide, 0.218 g of lithium chloride and 0.269 g of lithium bromide were mixed, and the resultant mixture was taken as a raw material mixture.

A sulfide solid electrolyte was prepared in the same manner as in Example 19 except that raw material mixtures were changed.

Then, σ of the sulfide solid electrolyte was 7.5 mS/cm. In addition, electron conductivity was less than $10^{-6}$ S/cm.

As a result of an XRD measurement, a peak arising from an argyrodite-type crystal structure was observed.

As a result of an ICP analysis, a molar ratio b (S/(P+Si)) was 5.2, a molar ratio c ((Cl+Br)/(P+Si)) was 1.6, and a ratio: c/b was 0.31.

[Generated Hydrogen Sulfide Amount from Sulfide Solid Electrolyte]

Figure 5:
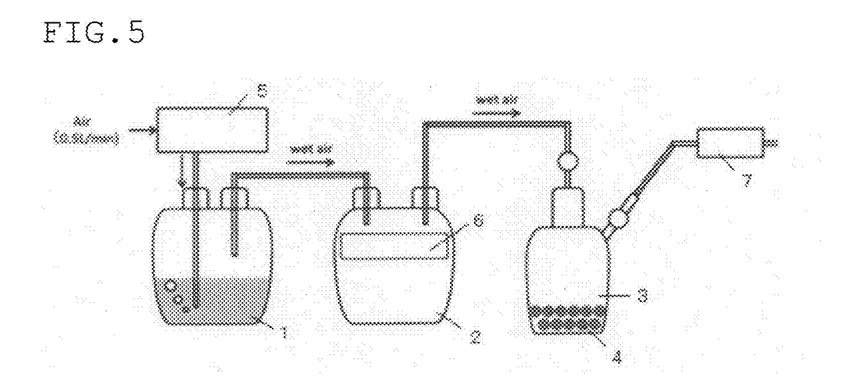
FIG. 5 is an explanatory drawing of an apparatus used for evaluation of a generated hydrogen sulfide amount from a sulfide solid electrolyte.

A generated hydrogen sulfide amount from the sulfide solid electrolyte prepared in Example 13, Example 36 and Comparative Example 2 each was evaluated by using the apparatus shown in FIG. 5. This apparatus is formed in a configuration by connecting a flask 1 for humidifying air, a flask 2 equipped with a thermometer and hygrometer 6 for measuring temperature and humidity of wet air, a Schlenk bottle 3 for having a measurement sample 4 therein, and a hydrogen sulfide analyzer 7 for measuring a concentration of hydrogen sulfide contained in air through a pipe in this order. An evaluation procedure is as follows.

About 0.1 g of powder sample prepared by well pulverizing a sample with a mortar in a nitrogen glow box under an environment of a dew point of −80° C. was weighed and put inside the 100 mL Schlenk bottle 3, and the bottle was sealed (numbering 4 in FIG. 5).

Next, air was flown into the flask 1 at 500 mL/min. A flow rate of air was measured with a flowmeter 5. Air was passed into water in the flask 1 and humidified. Subsequently, wet air was flown into the flask 2, and temperature and humidity of air were measured. The temperature and the humidity of air immediately after starting circulation was 25° C. and 80 to 90%, respectively. Then, the wet air was circulated inside the Schlenk bottle 3 and brought into contact with the measurement sample 4. The wet air circulated inside the Schlenk bottle 3 was passed through the hydrogen sulfide analyzer 7 (Model 3000RS, manufactured by AMI), and a hydrogen sulfide amount contained in the wet air was measured. A measurement time was taken as a period from a time immediately after air circulation to a time after 1 hour from circulation. In addition, the hydrogen sulfide amount was recorded at intervals of 15 seconds.

From a total of hydrogen sulfide observed in 2 hours, a generated hydrogen sulfide amount per 1 g of the sample (mg/g) was calculated. As a result, the generated hydrogen sulfide amount from the sulfide solid electrolyte in Example 13 was 26 mg/g, the generated hydrogen sulfide amount from the sulfide solid electrolyte in Example 36 was 14 mg/g, and the generated hydrogen sulfide amount from the sulfide solid electrolyte in Comparative Example 2 was 64 mg/g.

[Lithium Ion Battery]

A lithium ion battery was produced by using the sulfide solid electrolytes obtained in Example 13 and Comparative Example 1 each, and rate property was evaluated.

(A) Production of Lithium Ion Battery

In a stainless steel mold having a diameter of 10 mm, 50 mg of the sulfide solid electrolyte obtained in Example 13 or Comparative Example 1 was each put, and leveled flat to be uniform in a layer thickness of an electrolyte layer, and then a pressure of 185 MPa was applied from a top surface of the electrolyte layer by means of a hydraulic press machine, and the resultant material was pressure-molded.

As a positive electrode active material, $Li_4Ti_5O_{12}$-coated $LiNi_{0.8}Co_{0.15}Al_{0.05}O_2$, and as a solid electrolyte, the sulfide solid electrolyte obtained in Example 13 or Comparative Example 1 were mixed at a ratio of 70:30 by weight, and the resultant mixture was taken as a positive electrode material, 15 mg of the positive electrode material was put on the top surface of the electrolyte layer, and leveled flat to be uniform in a layer thickness of a positive electrode layer, and then a pressure of 407 MPa was applied from the top surface of the electrode layer by means of a hydraulic press machine, and the resultant material was pressure-molded.

Graphite powder, which was a negative electrode active material, and the sulfide solid electrolyte obtained in Example 13 or Comparative Example 1 were mixed at a ratio of 60:40 by weight, and the resultant material was taken as a negative electrode material. On a surface on a side opposite to the positive electrode layer of the electrolyte layer, 12 mg of the negative electrode material was put, and leveled flat to be uniform in a layer thickness of a negative electrode layer, and then a pressure of 555 MPa was applied from a top surface of the negative electrode layer by means of a hydraulic press machine, and the resultant material was pressure-molded. Thus, a lithium ion battery having a three-layer structure of the positive electrode, the solid electrolyte layer and the negative electrode was each prepared.

(B) Rate Property Test

The lithium ion battery produced in the above-described (A) was allowed to stand in a thermostat set at 25° C. for 12 hours, and then evaluated. At a first cycle, the battery was charged to 4.2 V at 0.1 C (0.189 mA) and discharged to 3.1 V at 0.1 C (0.189 mA), and from a second cycle to a tenth cycle, the battery was charged to 4.2 V at 0.5 C (0.945 mA) and discharged to 3.1 V at 0.5 C (0.945 mA). Capacity at the tenth cycle was measured. A lithium ion battery separately produced by using the same sample was used, and capacity at a tenth cycle upon charging and discharging the battery from a first cycle to the tenth circle at 0.1 C was measured. A ratio of the capacity upon charging and discharging the battery at 0.1 C to the capacity upon charging and discharging the battery at 0.5 C was taken as an evaluation value of rate property. The rate property of the lithium ion battery obtained by using the sulfide solid electrolyte in Example 13 was 73%. The rate property of the lithium ion battery obtained by using the sulfide solid electrolyte in Comparative Example 1 was 50%.

Several embodiments and/or Examples of the invention have been described in detail above, but those skilled in the art will readily modify the exemplary embodiments and/or Examples without substantially departing from new teachings and advantageous effects of the invention. Accordingly, all such modifications are included within the scope of the invention.

The entire contents of the description of the Japanese application serving as a basis of claiming the priority concerning the present application to the Paris Convention are incorporated by reference herein.

The invention claimed is:

1. A sulfide solid electrolyte, comprising lithium, phosphorus, sulfur, and two or more of elements X selected from the group consisting of halogen elements,
    wherein the sulfide solid electrolyte comprises an argyrodite-type crystal structure, and
    wherein a molar ratio of the sulfur to the phosphorus, b (S/P), and a molar ratio of the elements X to the phosphorus, c (X/P), satisfy formula (1):

$$0.23<c/b<0.57 \quad (1).$$

2. The sulfide solid electrolyte according to claim 1, wherein the molar ratio of the sulfur to the phosphorus, b (S/P), and the molar ratio of the elements X to the phosphorus, c (X/P), satisfy formula (1a):

$$0.25 \leq c/b \leq 0.43 \quad (1a).$$

3. The sulfide solid electrolyte according to claim 1, wherein the molar ratio of the sulfur to the phosphorus, b (S/P), and the molar ratio of the elements X to the phosphorus, c (X/P), satisfy formula (1b):

$$0.30 \leq c/b \leq 0.41 \quad (1b).$$

4. The sulfide solid electrolyte according to claim 1, wherein at least one of the elements X is chlorine.

5. The sulfide solid electrolyte according to claim 4, satisfying formula (2):

$$0.25<X_{Cl}<1 \quad (2)$$

wherein $X_{Cl}$ represents a molar ratio of the chlorine to the elements X.

6. The sulfide solid electrolyte according to claim 4, wherein the sulfide solid electrolyte satisfies formula (2):

$$0.25<X_{Cl}<1 \quad (2)$$

wherein $X_{Cl}$ represents a molar ratio of the chlorine to the elements X; and
    wherein at least one of the elements X is bromine.

7. The sulfide solid electrolyte according to claim 4, wherein the sulfide solid electrolyte satisfies formula (2):

$$0.25<X_{Cl}<1 \quad (2)$$

wherein $X_{Cl}$ represents a molar ratio of the chlorine to the elements X;
    wherein at least one of the elements X is bromine; and
    wherein a molar ratio of the lithium to the phosphorus, a (Li/P), the molar ratio of the sulfur to the phosphorus, b (S/P), and the molar ratio of the elements X to the phosphorus, c (X/P), satisfy formulas (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

8. The sulfide solid electrolyte according to claim 4, wherein the sulfide solid electrolyte satisfies formula (2):

$$0.25<X_{Cl}<1 \quad (2)$$

wherein $X_{Cl}$ represents a molar ratio of the chlorine to the elements X;
    wherein at least one of the elements X is bromine; and
    wherein the sulfide solid electrolyte comprises a composition represented by formula (3):

$$Li_a(P_{1-\alpha}M_\alpha)S_bX_c \quad (3)$$

wherein:
    M is one or more of elements selected from the group consisting of Si, Ge, Sn, Pb, B, Al, Ga, As, Sb and Bi, and X is two or more of elements selected from the group consisting of F, Cl, Br and I;
    a to c satisfy formulas (A) to (C); and
    $\alpha$ satisfies $0 \leq \alpha \leq 0.3$:

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

9. The sulfide solid electrolyte according to claim 4, wherein the sulfide solid electrolyte satisfies formula (2):

$$0.25<X_{Cl}<1 \quad (2)$$

wherein $X_{Cl}$ represents a molar ratio of the chlorine to the elements X;
    wherein diffraction peaks are measured at 2θ=25.2±0.5 deg and 29.7±0.5 deg in powder X-ray diffraction using CuKα rays; and
    wherein, in powder X-ray diffraction using CuKα rays, the sulfide solid electrolyte does not have a diffraction peak derived from lithium halide, or if the sulfide solid electrolyte has a diffraction peak derived from lithium halide, said diffraction peak satisfies formula (4):

$$0<I_A/I_B<0.1 \quad (4)$$

wherein $I_A$ represents an intensity of a diffraction peak of lithium halide, and $I_B$ represents an intensity of a diffraction peak at 2θ=25.2±0.5 deg.

10. The sulfide solid electrolyte according to claim 4, wherein the sulfide solid electrolyte satisfies formula (2):

$$0.25<X_{Cl}<1 \quad (2)$$

wherein $X_{Cl}$ represents a molar ratio of the chlorine to the elements X;
    wherein diffraction peaks are measured at 2θ=25.2±0.5 deg and 29.7±0.5 deg in powder X-ray diffraction using CuKα rays; and
    wherein, in powder X-ray diffraction using CuKα rays, the sulfide solid electrolyte does not have a diffraction peak at 2θ=17.6±0.4 deg and 2θ=18.1±0.4 deg, or if the sulfide solid electrolyte has a diffraction peak at 2θ=17.6±0.4 deg and 2θ=18.1±0.4 deg, said diffraction peak satisfies formula (5):

$$0<I_C/I_D<0.05 \quad (5)$$

wherein $I_C$ represents an intensity of a diffraction peak which is not a diffraction peak of an argyrodite-type crystal structure between the diffraction peaks at 2θ=17.6±0.4 deg and 2θ=18.1±0.4 deg, and $I_D$ represents an intensity of a diffraction peak at 2θ=29.7±0.5 deg.

11. The sulfide solid electrolyte according to claim 1, wherein diffraction peaks are measured at 2θ=25.2±0.5 deg and 29.7±0.5 deg in powder X-ray diffraction using CuKα rays.

12. The sulfide solid electrolyte according to claim 1, wherein at least one of the elements X is bromine.

13. The sulfide solid electrolyte according to claim 1, wherein a molar ratio of the lithium to the phosphorus, a (Li/P), the molar ratio of the sulfur to the phosphorus, b (S/P), and the molar ratio of the elements X to the phosphorus, c (X/P), satisfy formulas (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

14. The sulfide solid electrolyte according to claim 1, comprising a composition represented by formula (3):

$$Li_a(P_{1-\alpha}M_\alpha)S_bX_c \quad (3)$$

wherein:
M is one or more of elements selected from the group consisting of Si, Ge, Sn, Pb, B, Al, Ga, As, Sb and Bi, and X is two or more of elements selected from the group consisting of F, Cl, Br and I;
a to c satisfy formulas (A) to (C); and
a satisfies 0≤α≤0.3:

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

15. The sulfide solid electrolyte according to claim 1, wherein:
at least one of the elements X is chlorine; and
at least one of the elements X is bromine.

16. The sulfide solid electrolyte according to claim 1, wherein at least one of the elements X is chlorine; wherein at least one of the elements X is bromine; and wherein a molar ratio of the lithium to the phosphorus, a (Li/P), the molar ratio of the sulfur to the phosphorus, b (S/P), and the molar ratio of the elements X to the phosphorus, c (X/P), satisfy formulas (A) to (C):

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

17. The sulfide solid electrolyte according to claim 1, wherein at least one of the elements X is bromine; wherein the sulfide solid electrolyte satisfies formula (2):

$$0.25 < X_{Cl} < 1 \quad (2)$$

wherein $X_{Cl}$ represents a molar ratio of the chlorine to the elements X; and
wherein the sulfide solid electrolyte comprises a composition represented by formula (3):

$$Li_a(P_{1-\alpha}M_\alpha)S_bX_c \quad (3)$$

wherein:
M is one or more of elements selected from the group consisting of Si, Ge, Sn, Pb, B, Al, Ga, As, Sb and Bi, and X is two or more of elements selected from the group consisting of F, Cl, Br and I;
a to c satisfy formulas (A) to (C); and
a satisfies 0≤α≤0.3:

$$5.0 \leq a \leq 7.5 \quad (A)$$

$$6.5 \leq a+c \leq 7.5 \quad (B)$$

$$0.5 \leq a-b \leq 1.5 \quad (C)$$

wherein b>0 and c>0 are satisfied.

18. An electrode mix, comprising the sulfide solid electrolyte according to claim 1 and an active material.

19. A lithium ion battery, comprising the electrode mix according to claim 18.

20. A lithium ion battery, comprising the sulfide solid electrolyte according to claim 1.

* * * * *

UNITED STATES PATENT AND TRADEMARK OFFICE
CERTIFICATE OF CORRECTION

PATENT NO. : 10,483,587 B2
APPLICATION NO. : 16/239140
DATED : November 19, 2019
INVENTOR(S) : Kota Terai et al.

It is certified that error appears in the above-identified patent and that said Letters Patent is hereby corrected as shown below:

In the Claims
Column 30, Line 28:
Please replace "a satisfies $0 \leq \alpha \leq 0.3$:" with --$\alpha$ satisfies $0 \leq \alpha \leq 0.3$:--

Signed and Sealed this
Fourth Day of February, 2020

Andrei Iancu
*Director of the United States Patent and Trademark Office*